INVENTOR.
LAURIE D. THOMPSON

INVENTOR.
LAURIE D. THOMPSON
BY
ATTORNEY

United States Patent Office 3,347,332
Patented Oct. 17, 1967

3,347,332
EQUALIZING DRIVE FOR TANDEM
AXLE ROAD VEHICLES
Laurie D. Thompson, 132 W. Woodland Ave.,
Youngstown, Ohio 44502
Filed Aug. 6, 1965, Ser. No. 477,708
2 Claims. (Cl. 180—22)

This invention relates to road vehicles, principally trucks and tractors, of the kind having adjacent tandem load-bearing axles only one of which is driven by the motor power of the vehicle through a differential drive. The primary object of the invention is to provide an improved arrangement for idler wheels on either side of the vehicle whereby the peripheries of the differential-driven and road-engaging tires may be utilized, at desired times, to frictionally drive the peripheries of the adjacent road-engaging tires which are journaled on the free axle of the assembly. While such transferring drives have been heretofore broadly suggested by reason of their utility in effecting positive drive of all the wheels of the tandem assembly to assist in starting and traction on steep or slippery pavements, the arrangements heretofore proposed have not been practical for the reasons to be more fully set out below.

Heretofore, the power transferring wheels or spools or idlers in such tandem axle systems have been mounted for uniform and equal vertical movement on opposite sides of the vehicle. Since the apparatus is carried on the load-bearing frame of the vehicle contact and/or pressure between the idlers and the road-engaging tires cannot be uniform on opposite sides of the vehicle when the frame is tilted sideways by unequal loading or by a transverse slope in the roadway, for example, and consequently the power tarnsfer is often ineffectual on one side or the other of the vehicle. It is accordingly one of the principal objects of this invention to provide for the independent moving and loading of the drive-transferring idlers on the opposite sides of the vehicle whereby both of the free-trailing wheels of the tandem assembly will at all times be equally driven from the live-axle-driven wheels.

Another deficiency of the prior art is the absence of any effective arrangement for insuring that the driving pressure between the driving wheels and the idler is matched by the driving pressure between the idlers and the driven wheels. If the rotational axes of the idlers move vertically in a fixed relation to the frame of the vehicle, it will be at once apparent that due to unequal tire wear or lack of precise positional relation between the two axles that the idlers may bear more heavily on the tire or tires of one axle than on the tire or tires of the other axle whereby he transfer drive may be inefficient or ineffectual in whole or in part. Accordingly, a further object of the invention is to provide for the floating carriage of the idlers so that as the idlers are brought into pressure engagement with the tires their peripheries will float into equal pressure contact with the motive-driven tires and the otherwise free running tires of the tandem assembly.

The above and other objects and advantages of the invention will become apparent upon consideration of the following specification and the accompanying drawing wherein there is disclosed certain preferred embodiments of the invention.

Figure 2:
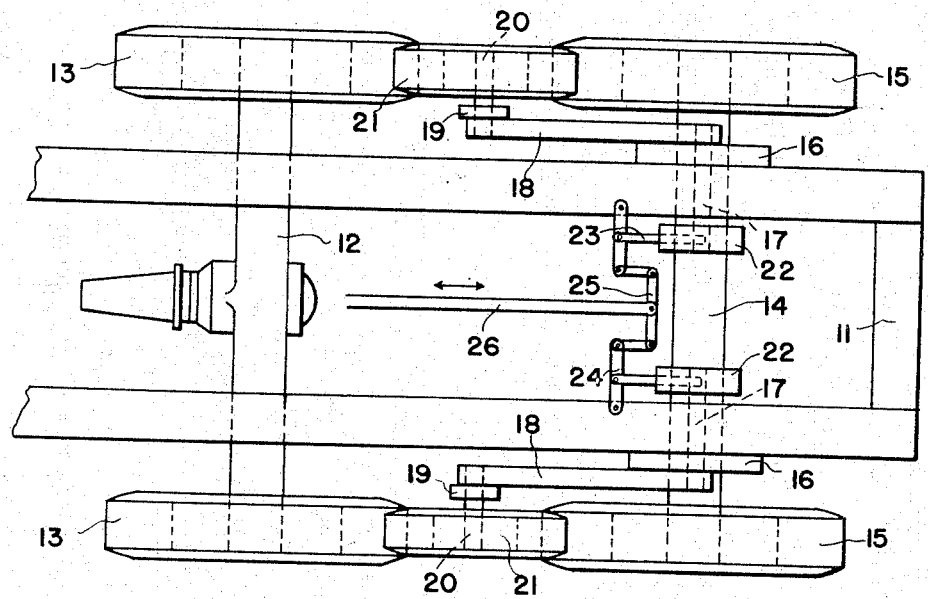
FIGURE 2 is a schematic showing, in plan, of the tandem drive section of the vehicle of FIGURE 1.
Figure 3:
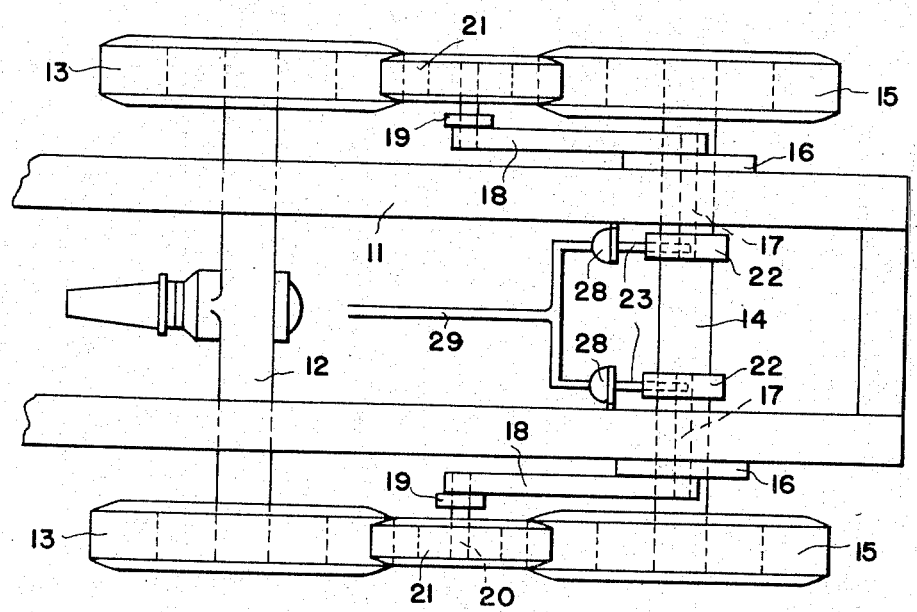
FIGURE 3 is a plan view similar to FIGURE 2 but showing a modification of the apparatus of FIGURES 1 and 2.

Referring to the drawing, reference numeral 10 designates generally a road tractor having a frame 11 from which is suspended a differential-driven axle shown schematically at 12 in FIGURES 2 and 3. This axle 12 mounts and drives a pair of wheels having road-engaging tires 13. These wheels and tires are shown in the drawing as being of the single type but in actual practice will more likely be of the dual type—i.e. having two tires in side-by-side relation on either side of the vehicle.

Also suspended from the frame 11 in close tandem relation with the axle 12 is a dead axle 14 on the outer ends of which are rotatably mounted other wheels having road-engaging tires 15. Again, in actual practice, the wheels and tires which are freely rotatable on the dead axle 14 are preferably of the dual type.

Journaled in or on the frame 11 with the aid of the blocks 16 which are rigidly secured to the frame are a pair of aligned but transversely disposed and spaced shafts 17. To the outer end of these shafts and outwardly of the side rails of the frame 11 are rigidly mounted arms 18 which extend to the space between the tires 13 and 15 where links 19 are pivotally connected to their ends for rocking movement about horizontal transversely extending axes. These links 19 carry outwardly extending spindles 20 on which are jouraneld the drive transfer or idler wheels 21. These wheels may be tired with suitable material such as rubber or brake lining which has an acceptable coefficient of friction with the rubber tread of the road tires 13 and 15.

It should be at once apparent that if the shafts 17 are independently rocked in a direction to move the arms 18 downwardly, the wheels 21 will be forcibly drawn into equal pressure engagement with the tires 13 and 15 on opposite sides of the vehicle whereby both the dead-axle wheels and tires 15 will be equally driven from the differential-driven wheels and tires 13 regardless of the transverse tilt of the frame 11 due to load or road conditions. In this manner, an effective four-wheel drive may readily be brought into play at any time when traction or road conditions indicate the need for the same. Ordinarily, however, the transfer wheels 21 will be carried in elevated position and allowed to simply idle on one or the other pairs of tires 13 or 15 but, if desired, suitable spring-biased means, not shown, may be employed to hold the wheels 21 out of contact with the tires when these wheels are in elevated position. In actual practice it will be desirable to so dimension the various parts of the assembly so that the wheels 21 will always be below the top plane or surface of the frame 11 so as not to interfere with the superimposed body in the case of a truck or the fifth wheel, in case of a tractor as illustrated.

Figure 1:
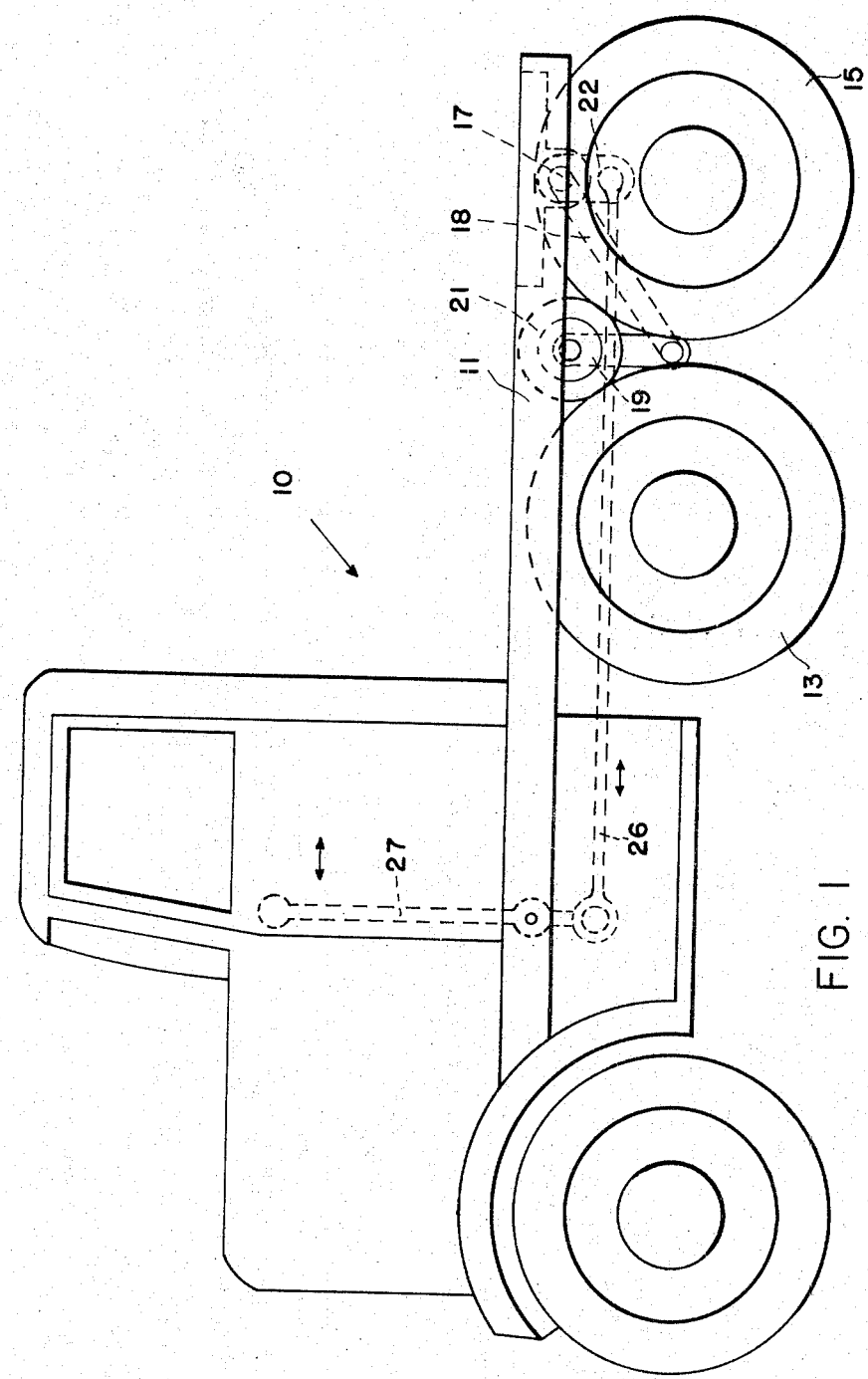
FIGURE 1 is a schematic side elevation of a road tractor having tandem rear axles and utilizing the apparatus of my invention.

To raise and lower the arms 18 and consequently the wheels 21, I provide either mechanical, air-operated, or other suitable means to rock the shafts 17 about their axes. For this purpose the inner ends of the shafts are rigidly fitted each with a crank 22 having a forwardly extending operating rod 23. In the mechanical embodiment of FIGURES 1 and 2, these rods 23 are connected at their forward ends to intermediate points on levers 24. As shown in FIGURE 2, the inner ends of these levers 24 are pivotally connected to a crosshead 25, the center point of which is pivotally connected to a forwardly extending rod 26. This rod 26 is arranged to be moved fore and aft by a lever 27 in the cab of the vehicle and readily accessible to the operator. The pivotal linkage 24, 25 acts to equalize the pressure or force between the two cranks 22 so that one of the wheels 21 may have a different vertical relation to the horizontal plane of the frame 11 than the other and yet provide the same frictional driving force between the tires 13 and 15. It should be obvious that when the lever 27 is moved forwardly the rod 26 will be moved to the rear and the cranks 22 will be rocked in such direction as to lower the arms 18 and bring the wheels 21 into pressure engagement with the tires 13 and 15. Upon movement of the lever 27 rearwardly, the arms 18 will be raised and the wheels 21 lifted off the tires 13 and 15.

In the embodiment of the invention shown in FIGURE 3 the rods 23 on the cranks 22 are coupled to air cylinders or motors 28 which may be of the diaphragm type— the kind used for air brakes on road vehicles. These motors are fed from a common conduit 29 which is supplied with air under pressure from the vehicle's air storage tank under the control of suitable valve means, not shown, located in the driver's cab. Normally, such motors are single-acting and their installation will be such that the application of air pressure will draw the wheels 21 into pressure contact with the road tires 13, 15 and suitable spring means, not shown, will be employed to retract these wheels 21. It should be observed, however, that the use of a separate air motor for each of the cranks 22 will result in independent rocking of the shafts 17 with an equal torque dependent on the pressure of the air supply. Again, the transfer drive will be uniform on either side of the vehicle regardless of the tilt of the frame 11 with respect to the axles 12 and 14.

It should be obvious that, if desired, the wheels 21 may be made somewhat thicker than shown and be contoured to better fit the treads of the tires 13 and 15. Also, if dual wheels and tires are used at either end of the axles the power transfer wheels may be elongated in an axial direction to span the sets of tires and, again, the wheels may be contoured at appropriate spacings to exactly fit the treads of the dual-mounted tires.

Having thus described my invention what I claim is:

1. A road vehicle having a frame including side rails, a motor-driven axle and an adjacent tandem dead axle suspended by said side rails, a tired road-engaging wheel at both ends of said axles, means for selectively coupling the wheels of said motor driven axle to those of said dead axle comprising a pair of drives, one at each side of the vehicle, each drive including yieldable power operating means, a shaft mounted on one of said side rails parallel to said dead axle, a crank connecting said power operating means to said shaft, an arm having one end rigidly connected to said shaft and extending in spaced relationship outside of said last mentioned side rail and below the top portion thereof, a power-transferring idler wheel pivotally mounted on the other end of said arm and located below the top of the frame and adapted to engage both of the wheels at one side of the vehicle, whereby operation of said yieldable power operating means will effect turning of said crank about said shaft and lowering of said arm about said shaft as a center to effect forcible, equal pressure engagement of said idler wheel with the cooperating vehicle wheels, and whereby said yieldable power operating means will permit lowering of one of said vehicle wheels more than the other.

2. Apparatus as recited in claim 1 wherein said yieldable power operating means includes an air motor connected to each of said cranks of said drives, and a common source of air pressure for said motors.

References Cited

UNITED STATES PATENTS 1,897,944    2/1933    Carter             180—222

FOREIGN PATENTS 1,150,495    8/1957    France.

A. HARRY LEVY, *Primary Examiner.*